(12) United States Patent
Workman, Jr.

(10) Patent No.: US 10,048,100 B1
(45) Date of Patent: Aug. 14, 2018

(54) SPECTROMETER SECONDARY REFERENCE CALIBRATION

(71) Applicant: WESTCO SCIENTIFIC INSTRUMENTS, INC, Brookfield, CT (US)

(72) Inventor: Jerome J. Workman, Jr., Danbury, CT (US)

(73) Assignee: WESTCO SCIENTIFIC INSTRUMENTS, INC, Brookfield, CT (US)

( * ) Notice: Subject to any disclaimer, the term of this patent is extended or adjusted under 35 U.S.C. 154(b) by 635 days.

(21) Appl. No.: 13/829,651

(22) Filed: Mar. 14, 2013

Related U.S. Application Data

(60) Provisional application No. 61/637,761, filed on Apr. 24, 2012.

(51) Int. Cl.
  *G01D 18/00* (2006.01)
  *G01J 3/28* (2006.01)
  *G06F 11/30* (2006.01)

(52) U.S. Cl.
  CPC ............... *G01D 18/00* (2013.01); *G01J 3/28* (2013.01)

(58) Field of Classification Search
  CPC .............................. G01J 3/2866; G01D 18/00
  USPC ..................... 702/24, 28, 85, 104, 179, 183; 250/252.1; 436/524
  See application file for complete search history.

(56) References Cited

U.S. PATENT DOCUMENTS

| | | | | |
|---|---|---|---|---|
| 5,121,337 A | * | 6/1992 | Brown | G01N 21/274 250/339.12 |
| 5,446,681 A | * | 8/1995 | Gethner | G01N 21/359 702/27 |
| 6,774,368 B2 | * | 8/2004 | Busch | G01J 3/28 250/339.02 |
| 6,816,605 B2 | | 11/2004 | Rowe et al. | |
| 2003/0023152 A1 | * | 1/2003 | Abbink | A61B 5/0075 600/316 |

(Continued)

OTHER PUBLICATIONS

PCT International Application No. PCT/US2013/037932, International Preliminary Report on Patentability.
PCT International Application No. PCT/US2013/037932, International Search Report dated Oct. 31, 2013 and Written Opinion dated Oct. 24, 2014.
European Patent Application 13721494.6-1610 filed Apr. 24, 2013, Foreign Office Action dated Dec. 13, 2017.

*Primary Examiner* — Phuong Huynh
(74) *Attorney, Agent, or Firm* — Thomas Horstmeyer, LLP; N Andrew Crain; Jason M. Perilla

(57) ABSTRACT

Aspects of spectrometer secondary reference calibration are described. In one embodiment, a diagnostic measurement for evaluation of an aspect of calibration in spectroscopy is performed. A result of the diagnostic measurement is analyzed to determine a deviation from an expected result. Based on the analysis, a correction algorithm may be applied to the aspect of calibration, in view of the deviation. In some embodiments, a product model diagnostic measurement is also performed for further evaluation of the aspect of calibration. A result of the product model diagnostic measurement is analyzed to determine a product model deviation from an expected result of the product model diagnostic measurement, and a product model correction algorithm is applied, if necessary. According to aspects of the embodiments described herein, using secondary reference standards permits reconstruction of calibration parameters without any need for a master instrument or other forms of calibrated reference instrumentation.

17 Claims, 9 Drawing Sheets

(56) References Cited

U.S. PATENT DOCUMENTS

2005/0236563 A1* 10/2005 Busch ................. G01J 3/28
                                              250/252.1
2006/0019409 A1*  1/2006 Nelson ............... G06K 9/00127
                                              436/524
2010/0042348 A1   2/2010 Bakker

* cited by examiner

I. Wavenumber Accuracy and Line Shape

II. Photometric Accuracy and Repeatability

SPECTROMETER SECONDARY REFERENCE CALIBRATION

CROSS-REFERENCE TO RELATED APPLICATIONS

This application claims the benefit of U.S. Provisional Application No. 61/637,761, filed Apr. 24, 2012, the entire contents of which are hereby incorporated herein by reference.

BACKGROUND

Spectrometers, spectrophotometers, and related spectrographic instruments are generally used to analyze materials in view of the absorption and reflection of waves of various wavelengths. For example, a spectrophotometer may measure materials in view of the absorption and reflection of visible, ultraviolet, and near-infrared light waves. The main components of a spectrophotometer include a wave source, a chamber or suitable means for holding a sample under test, and a wave radiation detector.

Generally, a spectrophotometer operates by directing radiation at a wavelength (or range of wavelengths) toward a sample under test, detecting an amount of radiation absorbed by the sample at the specific wavelength, converting the amount of absorbed radiation into a number or other metric, and displaying the number or metric for the specific wavelength. This process may be repeated over different wavelengths of radiation until a full spectrum of radiation has been analyzed for the sample under test.

Spectrographic instruments may be used to determine certain characteristics of materials under analysis. In that context, concentrations of constituents or physical characteristics of materials may be measured. For example, spectrographic instruments may be used to determine oil, protein, and moisture content in grain, fat content in meat, and the various contents in milk. Spectrographic instruments may also be used to analyze samples of bodily fluids, pharmaceuticals, and synthetic materials, for example.

Typically, when different spectrographic instruments measure a same sample, each will provide an instrument-specific measurement result. That is, the measurement results will likely vary, at least partially, for each of the different spectrographic instruments. These differences in measurements may be attributable to variations in mechanical and optical tolerances, ages of the instruments, variations in repairs made to instruments, and/or fluctuations in operating environments of the instruments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
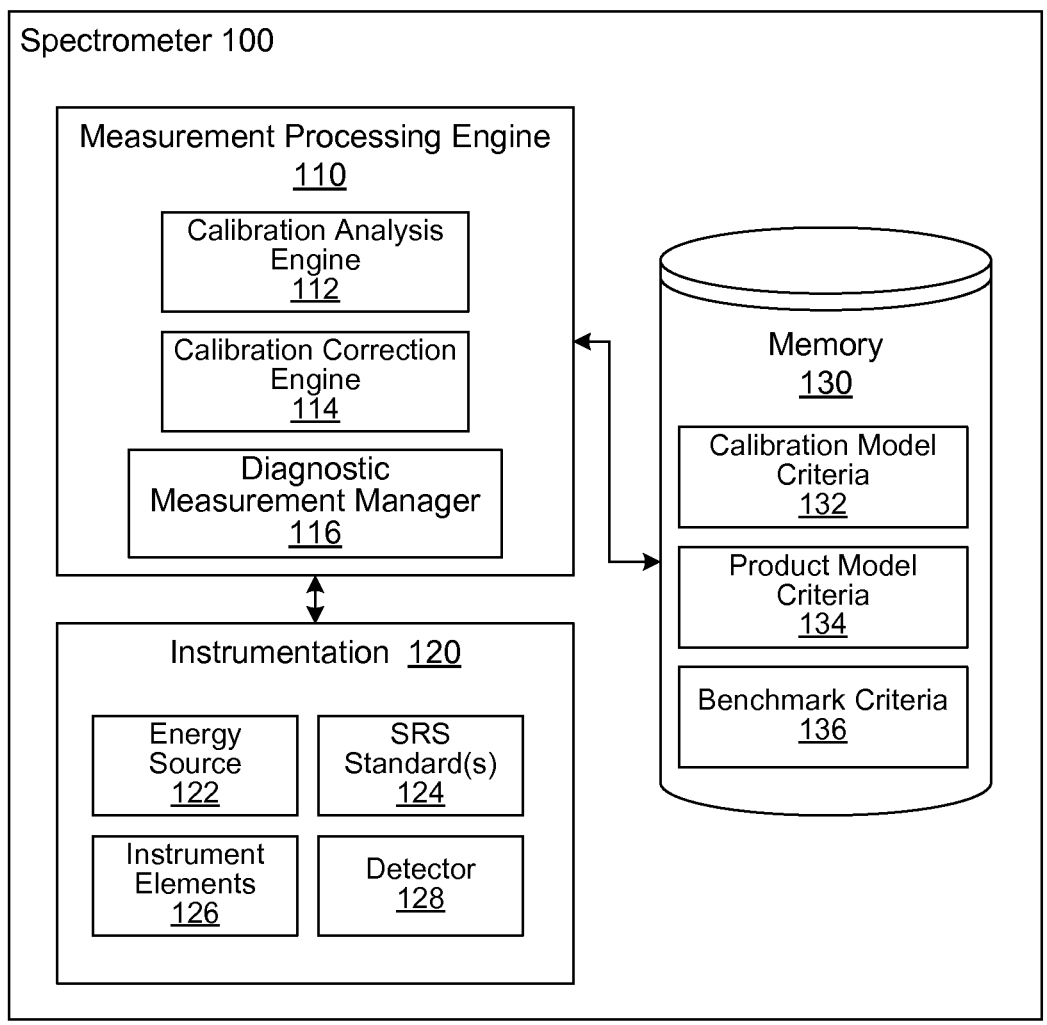
FIG. 1 illustrates a block diagram of elements of a spectrometer according to an example embodiment.

Spectroscopy is a growing field and there is a need for calibration transfer among spectrometry instruments. For example, when working with several spectrometers located at one or more geographic locations, it would be desirable to calibrate and perform calibration transfer among each of them.

However, it is relatively difficult to ensure that one instrument's measurement response is similar to another instrument's measurement response. Similarly, it is difficult to ensure that an instrument's measurement response conforms to a "standard" instrument response. Further, the setup of a calibration model for even one instrument generally involves a considerable amount of time and expense, especially for multivariate spectrometer calibration. It is noted that multivariate calibration of spectrometers is problematic due to small variations in energy absorbance over wavelengths in a spectrum, for example. In some conventional techniques, master instrument calibrations and large numbers of transfer samples are required.

In contrast to the conventional techniques, according to aspects of the embodiments described herein, calibration maintenance and transfer can be achieved without reliance upon a master instrument or standardization samples. Also, large numbers (e.g., n>10) of product samples are not necessary. Instead, the embodiments described herein perform instrument and product model calibration corrections using secondary reference samples (SRSs). Instruments that have been in use without reference calibration, as well as new or repaired instruments, can be calibrated and brought into the calibration schema described herein.

It is generally noted that the aspects of the embodiments described herein may be applicable to various instruments that rely upon or measure transmittance and/or reflection across the electromagnetic spectrum, such as spectrometers, spectrophotometers, and related spectrographic instruments, for example.

In this context, aspects of spectrometer secondary reference calibration are described. In one embodiment, a diagnostic measurement for evaluation of an aspect of calibration in spectroscopy is performed. A result of the diagnostic measurement is analyzed to determine a deviation from an expected result. Based on the analysis, a correction algorithm may be applied to the aspect of calibration, in view of the deviation. In some embodiments, a product model diagnostic measurement is also performed for further evaluation of the aspect of calibration. A result of the product model diagnostic measurement is analyzed to determine a product model deviation from an expected result of the product model diagnostic measurement, and a product model correction algorithm is applied, if necessary.

According to aspects of the embodiments described herein, using secondary reference standards permits reconstruction of calibration parameters without any need for a master instrument or other forms of calibrated reference instrumentation or product samples. The embodiments allow for more automation than previous techniques, with fewer sample measurements and full traceability to national laboratories. Further, by using SRSs to verify and correct or update various aspects of calibration for primary measurements of a spectrometer, and applying the calibration updates in calibration transfers, few (if any) product samples are necessary for testing or verification of transfer efficacy.

Turning now to the drawings, a general description of exemplary embodiments of a spectrometer that incorporates aspects of the automatic calibration described herein is provided, followed by a discussion of the operation of the same.

FIG. 1 illustrates a block diagram of elements of a spectrometer 100 according to an example embodiment. As illustrated in FIG. 1, the spectrometer 100 comprises a measurement processing engine 110, instrumentation 120, and a memory 130. The measurement processing engine 110 comprises a calibration analysis engine 112, a calibration correction engine 114, and a diagnostic measurement manager 116. The instrumentation 120 comprises an energy source 122, a one or more reference SRS standards 124, instrument elements 126, and a detector 128. The memory 130 comprises calibration model criteria 132, product model criteria 134, and benchmark criteria 136.

The measurement processing engine 110 is operable to perform various analysis algorithms to identify adjustments in calibration for the spectrometer 100, as an integral part of a total alignment spectrometer (TAS) system. In this context, it is noted that the calibration analysis engine 112, calibration correction engine 114, and diagnostic measurement manager 116 of the measurement processing engine 110 may be embodied by one or more logical elements including specific or general purpose circuitry, in some embodiments, configured by the execution of software.

Generally, the measurement processing engine 110 performs one or more diagnostic measurements for evaluation of one or more aspects of calibration of the spectrometer 100, and analyzes the results of the diagnostic measurements to determine any deviations from expected results of the measurements. Based on the deviations, the measurement processing engine 110 applies a correction algorithm to certain aspects of calibration of the spectrometer 100, to reconstruct calibration parameters of the spectrometer 100 to be in-line with factory transfer specification (FTS) tolerances.

In further aspects, the measurement processing engine 110 performs one or more product model diagnostic measurements for further evaluation of aspects of calibration of the spectrometer 100. The results of the product model diagnostic measurements are analyzed by the measurement processing engine 110 to determine product model deviations from expected results. Based on the product model deviations, the measurement processing engine 110 applies a product model correction algorithm to certain aspects of calibration of the spectrometer 100, to further reconstruct calibration parameters of the spectrometer 100. Additional aspects of the measurement processing engine 110 are described in further detail below.

With regard to the instrumentation 120, the energy source 122 comprises an electromagnetic energy (e.g., light or laser light) source, such as a white light source, a near-infrared (NIR) light source, a broad band wide range light source, a visible light source, a halogen light source, or a helium, argon, or deuterium light source, by way of example and not limitation. It is noted that other types of energy sources suitable for spectrometry are within the scope and spirit of the embodiments described herein.

The SRS standards 124 comprise secondary reference standards. The SRS standards 124 may serve as a basis for diagnostic measurements as described herein. In certain exemplary embodiments, the SRS standards comprise National Institute of Standards and Technology (NIST) (or national laboratory) traceable standards. In various embodiments, the standards may consist of NIST standard reference materials (SRMs), such as SRM 1920$a$ rare earth oxide (REO), a highly crystalline polystyrene sample of a certain thickness, a neutral density filter. Additionally or alternatively, the SRS standards 124 may include other non-traceable standards materials for measuring and/or calibrating wavelength, line shape, or linearity. For example, the SRS standards 124 may include stable materials such as optical materials or bare metal surfaces such as aluminum. In one embodiment, the SRS standards 124 comprise a set of (e.g., 3-7) SRS reference standards mounted to a turret or paddle which may be automatically (i.e., by the spectrometer 100 itself) or manually inserted into a measurement chamber of the spectrometer 100 for automated measurements.

According to aspects described herein, the SRS standards 124 are used for maintenance, calibration, and updates to calibrations of the spectrometer 100, especially after repairs and/or replacements of the energy source 122, for example. The use of traceable SRSs permits calibration parameters of the spectrometer 100 to be reconstructed from a combination of prior and subsequent measurements of the spectrometer 100. Further, this reconstruction of calibration parameters does not require the use of a master instrument or other forms of calibrated reference instrumentation. In this context, the spectrometer 100 may be calibrated to (or nearly to) factory transfer specification (FTS) tolerances. The FTS tolerances include multiple aspects of measurement criteria (e.g., aspects of certainty on units of measure) for performance of the spectrometer 100. Generally, calibration to FTS tolerances, as described herein, is embodied to achieve high accuracy in calibration, and may exceed a manufacturer's standard or routine performance criteria for calibration.

The detector 128 comprises detection and amplification circuits and electronics to derive spectral intensities and information when performing measurements. The instrument elements 126 may comprise, among other elements, one or more elements that divide energy from the energy source 122 into discrete wavelengths, a holding chamber or sample cell, and a detection system that collects energy from the source, for example.

In various embodiments, the memory 130 stores calibration model criteria 132, product model criteria 134, and benchmark criteria 136. The memory 130 may comprise any suitable type of memory for storing data.

The calibration model criteria 132 comprises data for various calibration models of the spectrometer 100. In this context, it is noted that the spectrometer 100 may rely upon various calibration models, depending upon certain settings of the spectrometer 100. For example, depending upon a wavelength of the energy source 122, a particular calibration model may be used by the spectrometer 100. In this context, the calibration model criteria 132 may include a NIR calibration model, for example, among others. In other aspects, the calibration model criteria 132 may also include results of diagnostic measurements taken with the SRS standards 124 just after an original calibration of the spectrometer 100. In this context, the calibration model criteria 132 includes a representation of measurement results taken with SRS samples during an original calibration of the spectrometer 100, for later reference.

Further, a particular calibration model may be relied upon by the spectrometer based on a material or product being analyzed for measurement. In this context, the product model criteria 134 comprises data for product calibration models of the spectrometer 100. For example, if the spectrometer 100 is being used for measuring agricultural products, then a particular product calibration model may be relied upon for each of various agricultural products. The product calibration model criteria 134 may also include results of product diagnostic measurements taken with the SRS standards 124 just after an original calibration of the spectrometer 100.

The benchmark criteria 136 comprises data on expectations for performance of the spectrometer 100 in taking measurements. For example, the benchmark criteria 136 may comprise expected measurement values, as determined and stored by the manufacturer of the spectrometer 100. Additionally or alternatively, the benchmark criteria 136 may be modified or updated as compared to factory settings, or replaced by a user of the spectrometer 100. Further, the benchmark criteria 136 may comprise data on an expected accuracy or repeatability of measurements taken by the spectrometer 100. More details on the benchmark criteria 136 is described below in the "Benchmark Criteria" section.

Figure 2:
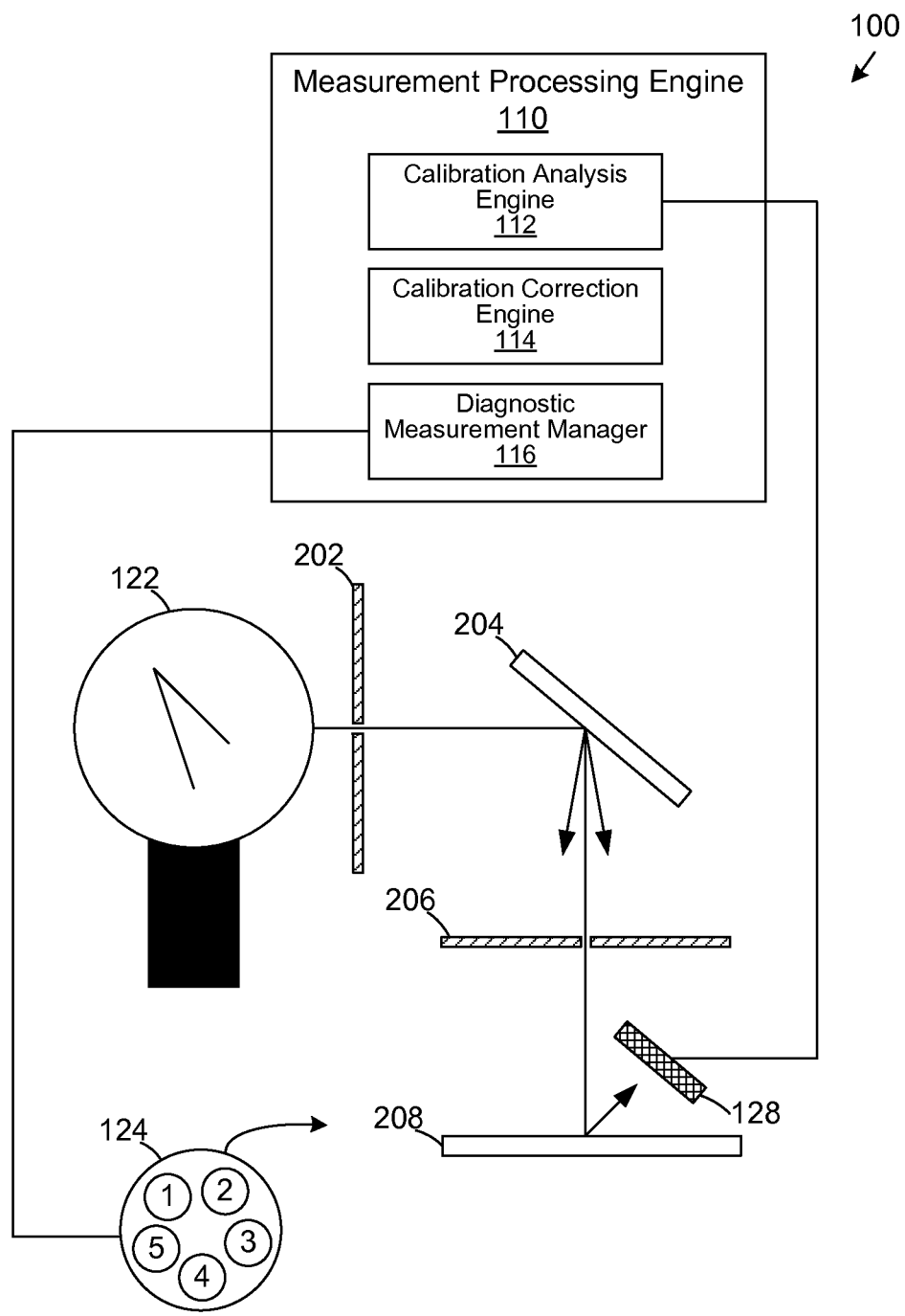
FIG. 2 illustrates an arrangement of instrumentation elements of the spectrometer of FIG. 1, according to an example embodiment.
Figure 3:
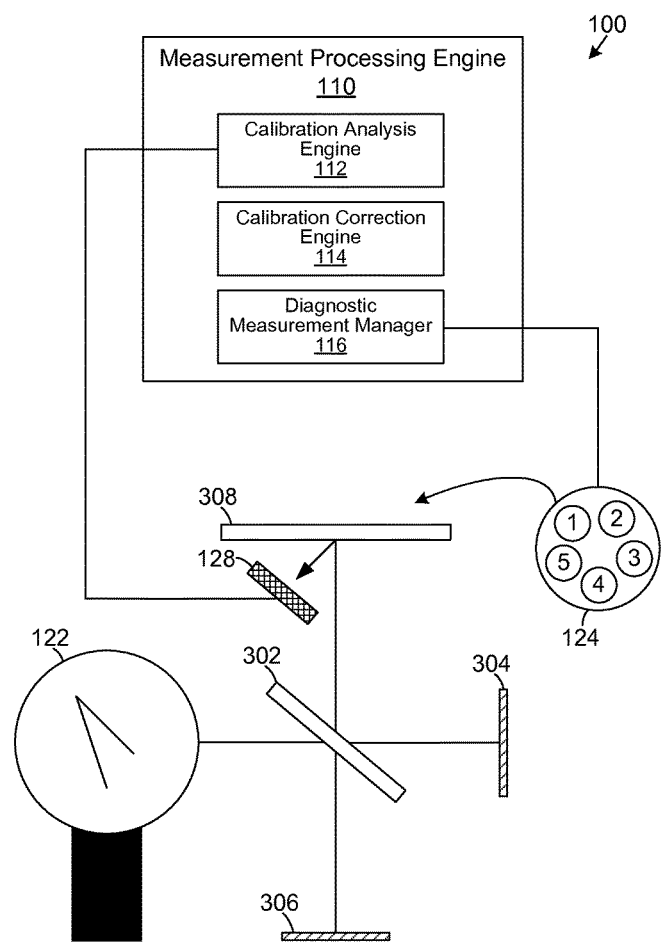
FIG. 3 illustrates an interferometric arrangement of instrumentation elements of the spectrometer of FIG. 1, according to an example embodiment.
Figure 4:
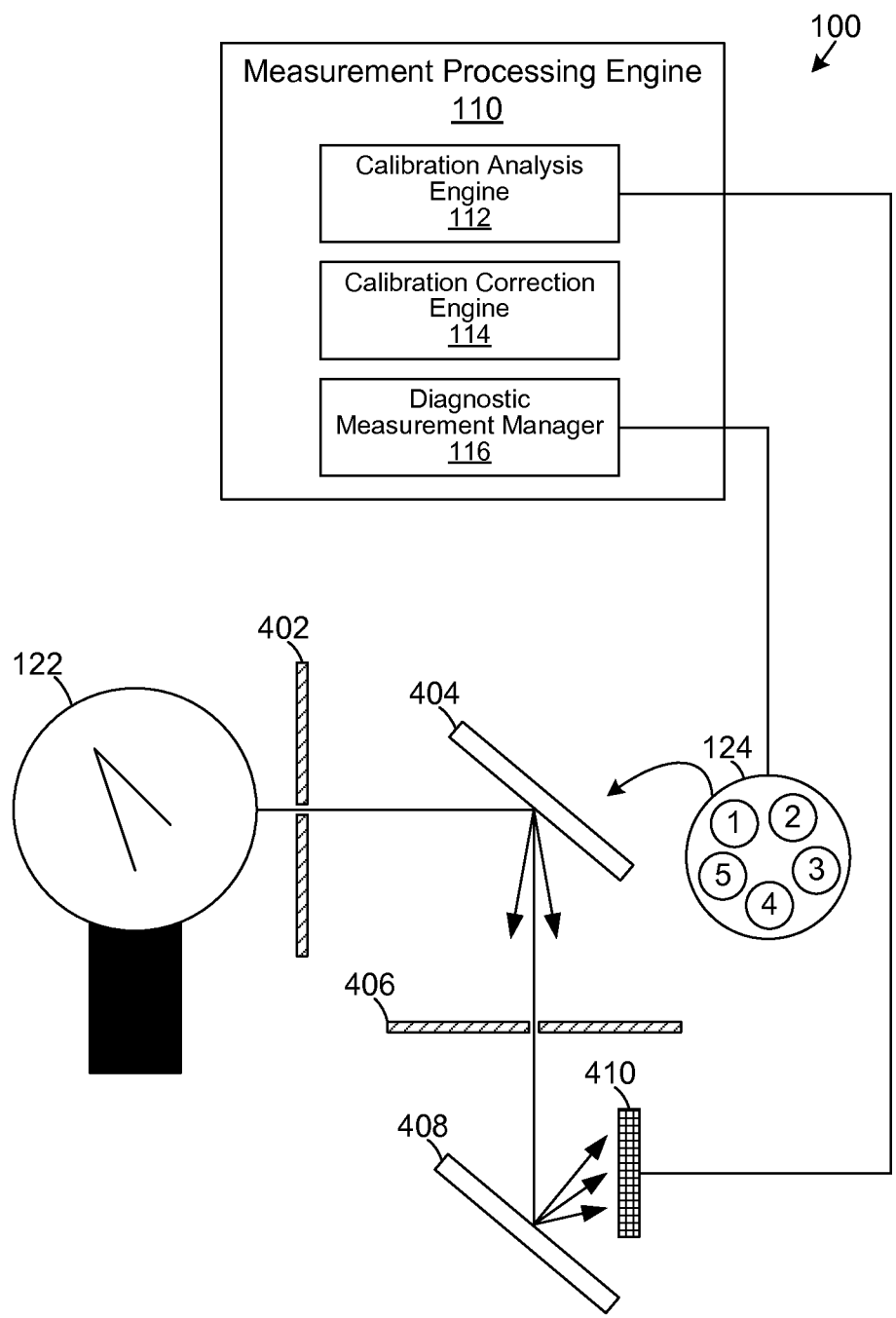
FIG. 4 illustrates an array-based arrangement of instrumentation elements of the spectrometer of FIG. 1, according to an example embodiment.

Turning to FIGS. 2-4, example arrangements of instrumentation elements of the spectrometer 100 are provided. FIG. 2 illustrates an arrangement of instrumentation elements of the spectrometer of FIG. 1, according to an example embodiment. In addition to the energy source 122, the SRS standards 124, the detector 128, and the measurement processing engine 110, FIG. 2 also illustrates an entrance slit or fiber optic waveguide 202, a dispersive element 204, an exit slit or fiber optic waveguide 206, and an analysis sample 208. In cases where diagnostic measurements are taken by the spectrometer 100, the analysis sample 208 may comprise one of the SRS samples 1-5 of the SRS standards 124.

Generally, electromagnetic energy or light from the energy source 122 passes through the entrance slit or fiber optic waveguide 202, reflects and disperses from the dispersive element 204, passes through the exit slit or fiber optic waveguide 206, and is projected onto the analysis sample 208. The detector 128 detects energy or light that is reflected from the analysis sample 208. In various embodiments, the detector 128 amplifies and conditions the reflected energy. Based on the reflected energy, the detector 128 generates a signal representative of aspects of the reflected energy, and provides it as feedback to the calibration analysis engine 112 of the measurement processing engine 110.

It is noted that, in cases where the spectrometer 100 performs a diagnostic measurement, the diagnostic measurement manager 116 may have one of the SRS samples from the SRS standards 124 inserted as the analysis sample 208, for measurement. As noted above, the SRS standards 124 may comprise a turret or paddle which may be inserted mechanically into a measurement chamber of the spectrometer 100, as directed by the diagnostic measurement manager 116, for automated measurements of the SRS reference materials.

FIG. 3 illustrates an interferometric arrangement of instrumentation elements of the spectrometer of FIG. 1, according to an example embodiment. In addition to the energy source 122, the SRS standards 124, the detector 128, and the measurement processing engine 110, FIG. 3 also illustrates a beam splitter 302, a movable mirror 304, a fixed mirror 306, and an analysis sample 308. In cases where diagnostic measurements are taken by the spectrometer 100, the analysis sample 308 may comprise one of the SRS samples 1-5 of the SRS standards 124.

Generally, electromagnetic energy or light from the energy source 122 is split and passes through the beam splitter 302, reflects from the movable and fixed mirrors 304 and 306, and is casted on the analysis sample 308. The detector 128 detects energy or light that is reflected from the analysis sample 208. In various embodiments, the detector 128 amplifies and conditions the reflected energy. Based on the reflected energy, the detector 128 generates a signal representative of aspects of the reflected energy, and provides it as feedback to the calibration analysis engine 112 of the measurement processing engine 110.

FIG. 4 illustrates an array-based arrangement of instrumentation elements of the spectrometer of FIG. 1, according to an example embodiment. In addition to the energy source 122, the SRS standards 124, and the measurement processing engine 110, FIG. 4 also illustrates an entrance slit or fiber optic waveguide 402, a dispersive element 404, an exit slit or fiber optic waveguide 406, an analysis sample 408, and an array detector 410. In cases where diagnostic measurements are taken by the spectrometer 100, the analysis sample 408 may comprise one of the SRS samples 1-5 of the SRS standards 124. As compared to the detector 128 in the embodiments of FIGS. 1-3, the array detector 410 detects a relatively wider range of wavelengths simultaneously. For example, the array detector 410 may measure a spectral range from ultraviolet to visible wavelengths.

Generally, electromagnetic energy or light from the energy source 122 passes through the entrance slit or fiber optic waveguide 202, reflects and disperses from the dispersive element 204, passes through the exit slit or fiber optic waveguide 206, and is projected onto the analysis sample 408. The detector 410 detects energy or light that is reflected from the analysis sample 408. In various embodiments, the detector 410 amplifies and conditions the reflected energy. Based on the reflected energy, the detector 410 generates a signal representative of aspects of the reflected energy, and provides it as feedback to the calibration analysis engine 112 of the measurement processing engine 110.

Figure 5:
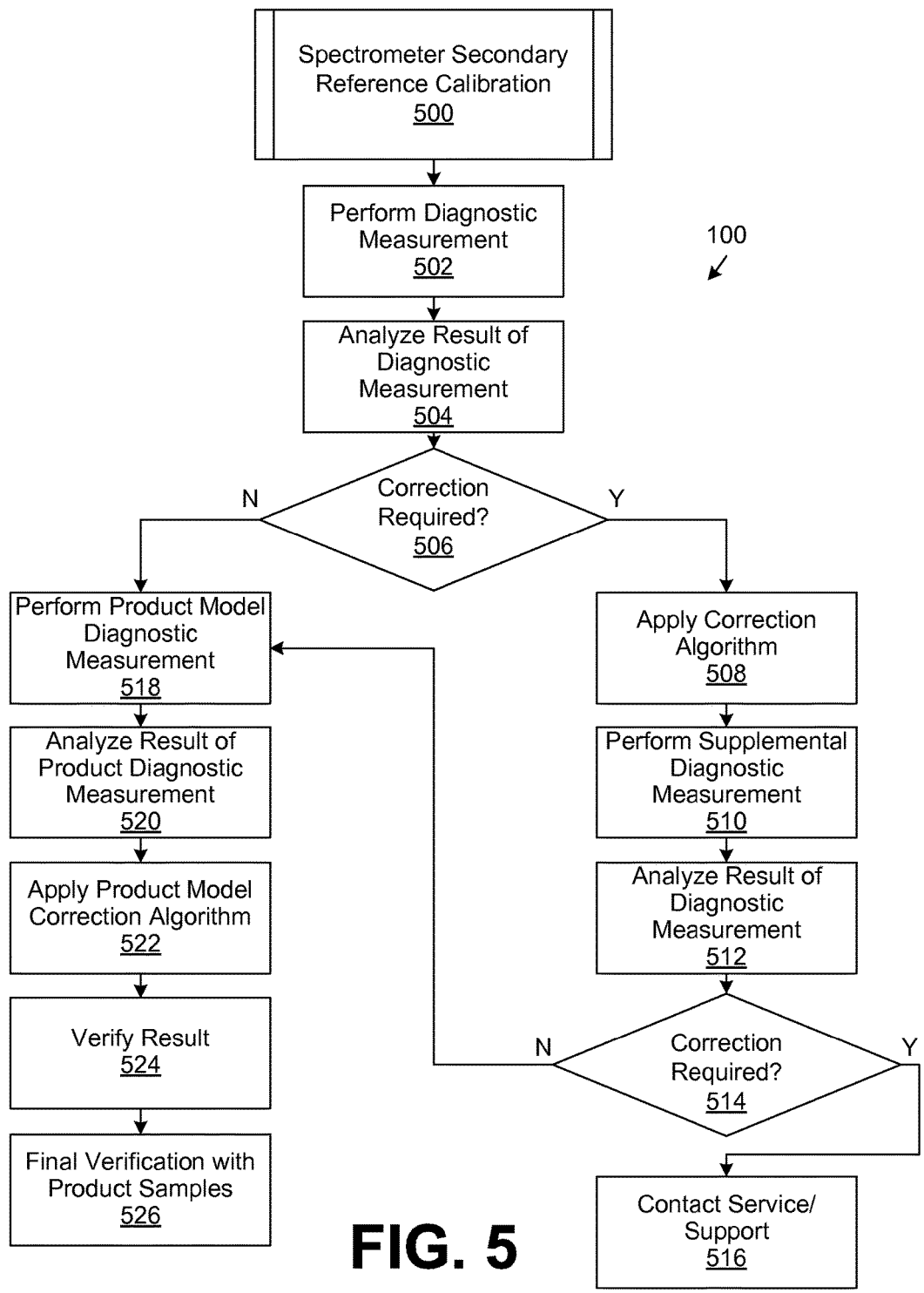
FIG. 5 illustrates an example process flow diagram of a process of spectrometer secondary reference calibration performed by the spectrometer of FIG. 1 according to an example embodiment.

Referring next to FIG. 5, a process flow diagram illustrating example processes performed by the spectrometer 100 of FIG. 1 are provided. It should be appreciated that the flowchart of FIG. 5 provides merely one example functional arrangement that may be employed to implement the operations of the spectrometer 100, as described herein. In certain aspects, the flowchart of FIG. 5 may be viewed as depicting an example of steps performed by the spectrometer 100 according to one or more embodiments. In alternative embodiments, a spectrometer or spectroscopy instrument similar to the spectrometer 100 may perform the processes illustrated in FIG. 5.

FIG. 5 illustrates an example process flow diagram of a process 500 of secondary reference calibration performed by the spectrometer 100 of FIG. 1 according to an example embodiment. At the outset, it is noted that the process 500 may be performed automatically, manually, or as a combination of automatic and manual steps performed by the spectrometer 100 and a user of the spectrometer 100. The process 500 may be performed once the spectrometer 100 is installed at a user site, after a repair of the spectrometer 100, or at any time further calibration is desired.

In the process 500, reference numeral 502 comprises performing a diagnostic measurement for evaluation of an aspect of calibration in spectroscopy. In this context, the diagnostic measurement manager 116 may direct the spectrometer 100 to perform one or more diagnostic measurements on one or more samples of the SRS standards 124. Feedback or results from the one or more diagnostic measurements is provided to the calibration analysis engine 112.

As further described below, measurements for evaluation of certain aspects of calibration may be performed at reference numeral 502. A non-limiting set of the measurements include measurements for wavenumber accuracy, wavenumber repeatability, wavelength linearity, wavelength reproducibility, photometric accuracy, photometric repeatability, photometric reproducibility, photometric linearity, photometric noise, photometric drift, signal averaging integrity, instrument line shape, detector response, source color temperature, instrument temperature, or sample temperature.

In some embodiments, various diagnostic measurements are performed by the spectrometer 100, in succession, at reference numeral 502, for evaluation of various aspects of calibration. These diagnostic measurements may be performed on the same or different samples of the SRS standards 124. An example set of diagnostic measurements is further detailed below in the "Instrument Optical Quality Performance Tests" section. In certain exemplary embodiments, a set of diagnostic measurements performed at reference numeral 502 is selected for alignment of performance criteria among different spectrometers. That is, the set of diagnostic measurements may be selected such that, if the set is performed on each of a plurality of spectrometers, then each of the spectrometers can be expected to exhibit a substantially identical measurement response. Here, it is noted that, among the aspects of calibration described herein, if different spectrometers are calibrated to only one of the aspects, the different spectrometers may not exhibit a substantially identical response. Thus, for repeatability of various calibration aspects among spectrometers, the set of diagnostic measurements performed at reference numeral 502 includes, for example, at least diagnostic measurements on wavelength accuracy, wavelength linearity, photometric accuracy, photometric linearity, instrument line shape, and detector response.

At reference numeral 504, the process 500 includes analyzing a result of the diagnostic measurement performed at reference numeral 502, to determine a deviation from an expected result of the diagnostic measurement. For example, the calibration analysis engine 112 analyzes the results to determine whether a correction or update in calibration of the spectrometer 100 is required, based on a comparison of the result of the diagnostic measurement to benchmark performance criteria for the measurement, for example. The results of the measurement may be compared with data stored in the benchmark criteria 136 of the memory 130 (FIG. 1), for example.

The comparison of the result of the diagnostic measurement to the benchmark performance criteria at reference numeral 504 may identify a deviation from an expected result of the diagnostic measurement. For example, a diagnostic measurement on wavelength linearity may be compared to benchmark performance criteria for linearity of the measurement, as stored in the benchmark criteria 136. In other aspects, a diagnostic measurement on wavelength linearity may be compared to previous measurement results on wavelength linearity, as stored in the memory 130. Additionally or alternatively, the result of the diagnostic measurement may be compared to pass or fail threshold criteria for the measurement. In this case, a diagnostic measurement on wavelength linearity may be compared to pass or fail threshold criteria for linearity of the measurement, as stored in the benchmark criteria 136.

It is additionally noted that, where more than one diagnostic measurement is performed at reference numeral 502, the calibration analysis engine 112 respectively analyzes results from each of the diagnostic measurements. In one embodiment, a failure or deviation in results for one diagnostic measurement may lead to calibration of the spectrometer 100, for at least the aspect of calibration associated with the failure. In other embodiments, calibration of the spectrometer 100 may occur if a predetermined number of diagnostic measurements generate feedback results that fall outside of an expected range for such results.

If the calibration analysis engine 112 determines at reference numeral 506 that correction to one or more aspects of calibration is required, the process 500 proceeds from reference numeral 506 to reference numeral 508. At reference numeral 508, the process 500 includes applying a correction algorithm. For example, the calibration correction engine 114 applies a correction algorithm to a calibration model stored in the memory 130, to improve certainty in measurements taken by the spectrometer 100 by adjusting or reconstructing calibration parameters or aspects of the model. Reconstruction of the calibration parameters may include reconstructing parameters of the calibration model criteria 132 stored in the memory 130. Here, it is noted that the calibration model criteria 132 may include several calibration models that have been adjusted or modified over time, based on successive adjustments made during automatic calibrations, stemming from an initial factory calibration by a manufacturer of the spectrometer 100. Further, it is noted that each of the calibration models generally comprises several aspects of calibration, such as wavenumber repeatability, wavelength linearity, and/or wavelength reproducibility, for example. In this context, it is noted that the calibration correction engine 114 may apply a plurality of correction algorithms to various calibration models stored in the memory 130.

As discussed above, the application of a correction algorithm may be applied to improve certainty in measurements of wavenumber accuracy, wavenumber repeatability, wavelength linearity, wavelength reproducibility, etc. The correction algorithm (or algorithms) applied at reference numeral 508 seek to calibrate the spectrometer 100 so as to substantially eliminate the deviation in the result of the diagnostic measurement from the expected result for the diagnostic measurement. In some aspects and embodiments, the spectrometer 100 is able to automatically recalibrate itself to a pre-defined performance specification at reference numeral 508, for one or more aspects of calibration or criteria of performance.

When corrections are indicated as being necessary in response to more than one diagnostic measurement, then correction algorithms are applied by the calibration correction engine 114 for each test failed. The corrections applied at reference numeral 508 may comprise internal reference calibrations and line shape corrections, for example. The correction algorithms may include linear and/or non-linear algebraic alignment correction functions, as well as digital and electronic filtering techniques. These algorithms may be applied to X and Y result dimensions, as well as to multivariate instrument criteria. In various embodiments, the corrections can be zero-, first-, second-, or higher-order corrections. Generally, the corrections are stored in the memory 130 for application to subsequent measurements by the spectrometer 100.

After reference numeral 508, the process 500 proceeds to reference numeral 510, which includes performing a supplemental or secondary diagnostic measurement. As with reference numeral 502, the diagnostic measurement manager 116 directs the performance of the supplemental or secondary diagnostic measurement at reference numeral 510. Generally, the supplemental diagnostic measurement performed at reference numeral 510 is similar to that performed at reference numeral 502. In this manner, the spectrometer 100 can determine whether the application of the correction algorithm at reference numeral 508 achieved the desired calibration of the spectrometer 100.

At reference numeral 512, the process 500 includes analyzing a result of the secondary diagnostic measurement to determine whether a deviation still exists from an expected result of the diagnostic measurement. Any deviation may be compared to benchmark performance criteria. Additionally or alternatively, the deviation may be compared to pass or fail threshold criteria. If the result of the secondary diagnostic measurement deviates from the benchmark performance criteria, for example, or fails a pass or fail threshold criteria test, the process proceeds from reference numeral 514 to reference numeral 516. At reference numeral 516, the process 500 includes contacting service or support for the spectrometer 100. In this case, a type of malfunction is indicated and a service support visit is requested from a service expert.

Alternatively, if the analysis of the result of the secondary diagnostic measurement taken at reference numeral 510 is determined at reference numeral 512 to substantially match the benchmark performance criteria for the secondary diagnostic measurement, the process 500 proceeds from reference numeral 514 to reference numeral 518. In this case, further correction or adjustment of aspects of calibration of the spectrometer 100 are not required.

At reference numeral 518, the process 500 includes performing a product model diagnostic measurement. Here, an SRS sample of the SRS standards 124 may be measured by the spectrometer 100 using a product calibration model stored in the product model criteria 134. At reference numeral 520, the process 500 includes analyzing a result of the product model diagnostic measurement. Here, the calibration analysis engine 112 analyzes the result of the product model diagnostic measurement to determine whether a correction or update in a product calibration of the spectrometer 100 is required. It is noted that, because the spectrometer 100 may be used to take measurements on samples from various fields (e.g., medical, agricultural, pharmaceutical, etc.) using various product calibration models, these product models may be analyzed, adjusted, and/or reconstructed at reference numerals 520 and 522.

For example, at reference numeral 520, a product diagnostic measurement for protein, measured using a specific product calibration model and one or more standard materials of the SRS standards 124, may be compared to benchmark performance criteria stored in the benchmark criteria 136. As another example, a product diagnostic measurement for moisture or fat using a specific product model calibration and one or more standard materials of the SRS standards 124 may be compared to the benchmark performance criteria stored in the benchmark criteria 136. The comparison of the results of the product model diagnostic measurement to the benchmark performance criteria at reference numeral 520 may identify a deviation from an expected result for one or more product calibration models. Generally, as compared to the analysis performed at reference numerals 504 or 512, the analysis performed at reference numeral 522 is tailored for considerations in testing a particular product (e.g., protein, fat, wheat, etc.), as a particular product calibration model is used.

Alternatively or additionally, at reference numeral 520, a product diagnostic measurement for protein, measured using a specific product calibration model and one or more standard materials of the SRS standards 124 on one instrument, may be compared to benchmark performance criteria of the same measurement taken by a second or subsequent instrument, as stored in the benchmark criteria 136. In other aspects, a product diagnostic measurement for moisture or fat using a specific product model calibration and one or more standard materials of the SRS standards 124 may be compared to previous measurement results using a second or subsequent instrument. The comparison of the results of the product model diagnostic measurement to the benchmark performance criteria of secondary instruments at reference numeral 520 may identify a deviation from an expected result for the product model across instruments.

When corrections or adjustments to a product model calibration are determined to be necessary based on the analysis at reference numeral 520, the calibration correction engine 114 applies a product model correction algorithm to the product model calibration at reference numeral 522. The corrections applied at reference numeral 522 may comprise internal reference calibrations and line shape corrections, for example. The correction algorithms may include linear and/or non-linear algebraic alignment correction functions, as well as digital and electronic filtering techniques. These algorithms may be applied in X and Y result dimensions, as well as to multivariate instrument criteria. In various embodiments, the corrections can be zero-, first-, second-, or higher-order. Generally, the corrections are stored in the memory 130 for application to subsequent measurements by the spectrometer 100.

At reference numeral 524, the results of the application of the product model correction algorithm at reference numeral 522 are verified. In some embodiments, the verification at reference 524 may include further testing and comparison with benchmark criteria, as necessary, to ensure that the spectrometer 100 is operating in-line with FTS tolerances, for example. Similarly, in some embodiments, at reference numeral 526, the results of calibration of the spectrometer 100 are verified, finally, using actual product samples. That is, at reference numeral 526, product samples other than those included in the SRS standards 124 may be tested and verified, as a final verification. It is noted that the number of product samples tested to verify calibration at reference numeral 526, if any, should be less than the number typically required for an alternative type or means for calibration of the spectrometer 100. It is noted that the final calibration of the spectrometer 100 at reference numeral 526 is optional, and may be omitted in various embodiments. If verification fails at either reference numerals 524 or 526, it may be necessary to contact service for the spectrometer 100.

In other aspects, after any calibration updates have been made to the calibration models stored in the memory 130, this data may be transferred to other spectrometer instruments or similar instruments platforms. For example, product calibration models may be transferred among instruments or instrument platforms, as a basis for a product calibration model for other instruments. This is possible because the SRS samples in the SRS standards 124 include samples important for calibration of essential photometric, wavelength, and instrument line shape performance parameters. Thus, the SRS samples in the SRS standards 124 provide adequate instrument characterization to permit suitable calibration transfer.

Figure 6:
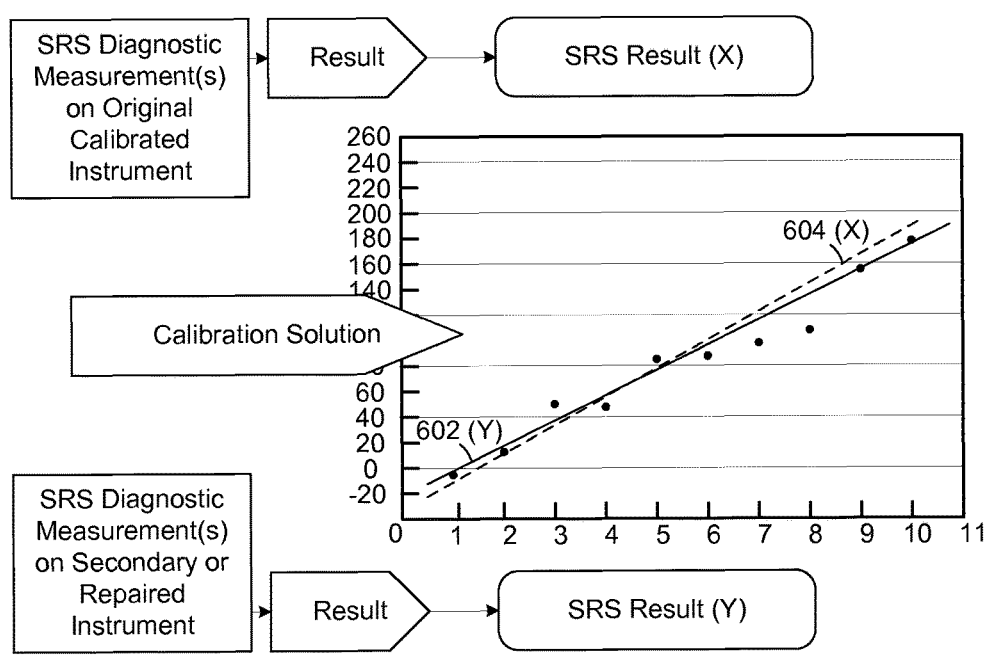
FIG. 6 illustrates a representation of an adjustment to a calibration model based on results of a diagnostic measurement, according to an example embodiment.

Turning to FIG. 6, a representation of an adjustment to a calibration model based on results of a diagnostic measurement, according to one embodiment, is illustrated. In FIG. 6, an original, calibrated instrument is used to measure SRS samples using an NIR calibration model. The results are illustrated in the original result line 604. These results are compared to the results obtained on a second instrument or the same "original" instrument following certain repairs (e.g., lamp or energy source replacement). A calibration solution or more correction algorithms are applied.

As noted previously, the correction algorithms may involve specialized linear and/or non-linear algebraic and multivariate alignment functions. The alignment functions may be applied in X and Y dimensions and to multivariate instrument criteria of the NIR calibration model. Thus, performance is adjusted or corrected, by adjustment of the NIR calibration model, to be substantially the same as that of an originally calibrated instrument. In FIG. 6, a first-order example of correction to an NIR calibration model is performed by adjusting the diagnostic result line 602 to the original result line 604. The adjustments are generally stored in a memory such as the memory 130, for example.

Figure 7:
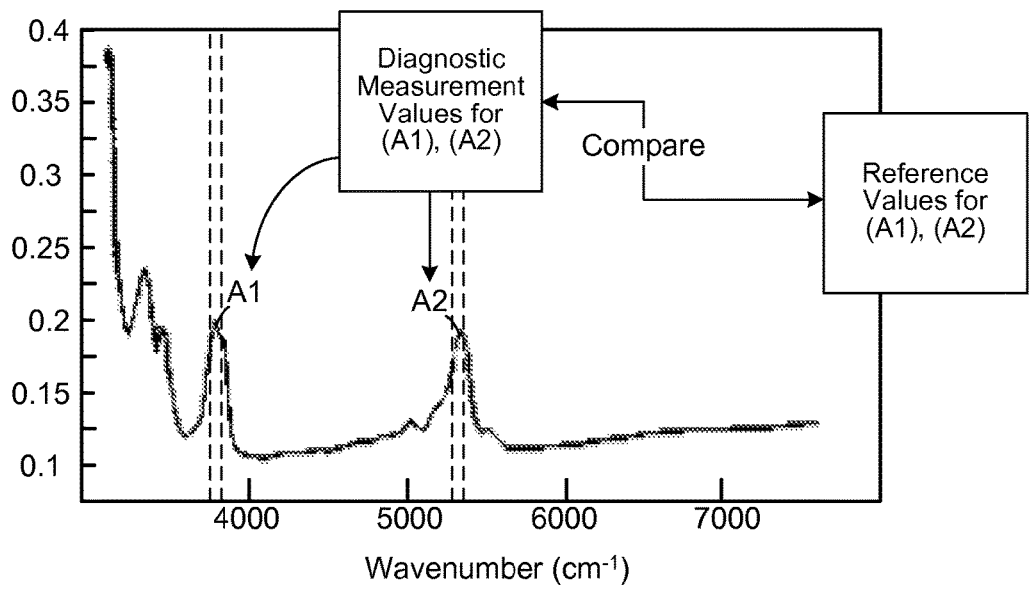
FIG. 7 illustrates a representation of a comparison of results from a diagnostic measurement to a stored reference set of result values, according to one embodiment.
Figure 7:
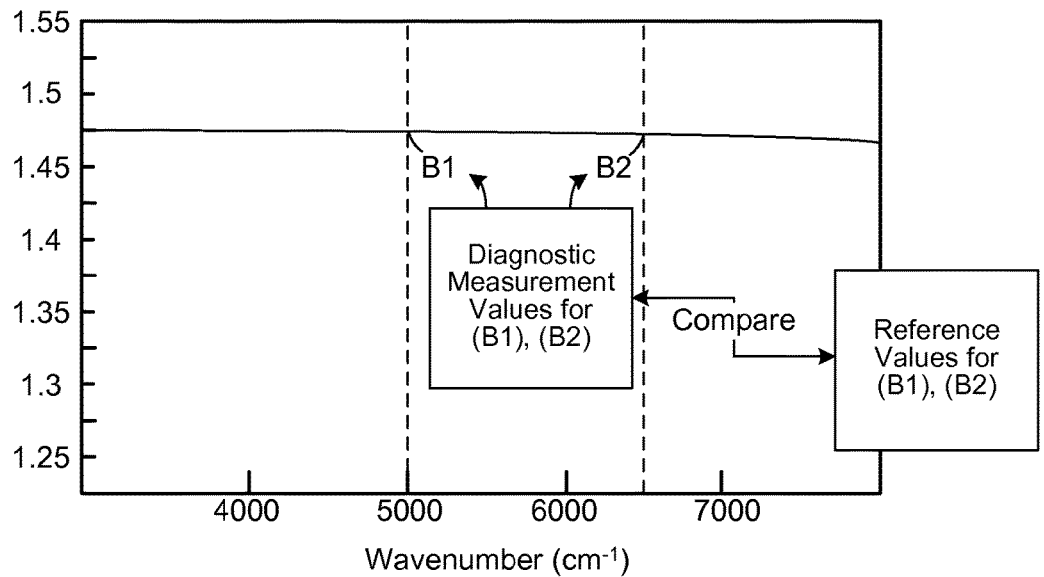

Turning to FIG. 7, a representation of a comparison of results from a diagnostic measurement to a stored reference set of result values, according to one embodiment, is illustrated. In FIG. 7, results of diagnostic measurements for wavelength accuracy and line shape and diagnostic measurements for photometric accuracy and repeatability are compared to expected results for such measurements. A comparison of the results, taken by one device, can be made to a stored reference set of result values measured by the device when the device was originally calibrated, for example. Thus, one or more reference tables of the result values are compared to the results of diagnostic measurements. The diagnostic measurement result values are corrected to the reference values, for various samples. For example, in FIG. 7, each sample A1, A2, B1, and B2, may be compared and adjusted to a reference value. The adjustment may include an adjustment to one or more calibration models, as described herein.

Benchmark Criteria

Table 1, below, provides various examples of benchmark performance criteria. It is noted that the specifications for testing, calibration, and calibration transfer may be determined empirically and/or according to standards, such as the ASTM 1944 standard, for example. Table 1 is broken into three primary sections including (1) instrument optical quality tests, (2) signal averaging tests, and (3) instrument line shape tests.

The benchmark performance criteria in Table 1 may be used, for example, in the analysis and comparison of diagnostic measurement results performed by the measurement processing engine 110 of FIG. 1, and as outlined in the process 500 of FIG. 5 at reference numerals 504, 512, and/or 520.

TABLE 1

1. Instrument Optical Quality Tests

| | |
|---|---|
| 1.1 Wavenumber Accuracy | Absolute deviation should be approximately ±0.8 cm$^{-1}$ versus NIST reference following calibration using NIST traceable reference measurements for approximately 5952.0 and 4336.3 cm$^{-1}$ bands of crystalline polystyrene (approximately 1.0 mm thickness). Accuracy should be approximately ±0.1 cm$^{-1}$ in agreement with calibration reference as absolute maximum deviation. |
| 1.2 Wavenumber Repeatability | About <0.01 cm$^{-1}$ (1 sigma). |
| 1.3 Absorbance/ Response Accuracy | Absolute deviation should be approximately ±0.02% R versus NIST traceable measurement of approximately 0.09% R (3.046 Au) to approximately 0.10% R (3.000 Au) for specific standards at approximately 1333 nm (7500 cm$^{-1}$) and approximately 2222 nm (4500 cm$^{-1}$), respectively. Accuracy should be approximately ±0.01% R (± 0.02 Au) in agreement with calibration reference as absolute maximum deviation. |
| 1.4 Absorbance/ Response Repeatability | About <0.001 Au (1 sigma) at 3.0 Au (equivalent to 0.000001 at 0 Au). |
| 1.5 Photometric Linearity | Slope: approximately 1.00 ± 0.02. Intercept: approximately ±0.02 (absolute) for method versus calibrated instrument(s). |
| 1.6 Photometric Noise | RMS approximately <0.001 Au for approximately 0.1% T neutral density filter (3 Au) standard. |

2. Signal Averaging Tests

| | |
|---|---|
| 2.1. Random Noise Test | Should pass test from 0 to 120 seconds or more (about 120 seconds nominal). |
| 2.2 Noise Test (Including Medium- or Short-term Drift) | Should pass test from 0 to 60 seconds or more (about 60 seconds nominal). |
| 2.3 Noise Test (Including Long-term Drift) | Should pass test to 60 seconds (about 60 seconds nominal). |

3. Instrument Line Shape (ILS) Tests

| | |
|---|---|
| 3.1 Center Wavelength Measured | Accuracy should be approximately ±0.05 cm$^{-1}$ in agreement with calibration reference line using interpolation or center of mass peak picking method as maximum deviation across instruments at approximately 4336.3 cm$^{-1}$. |
| 3.2 FWHM Measured (% deviation) | Approximately <5% deviation from calibration reference instruments as absolute maximum deviation. |
| 3.2 Asymmetry Measured (% deviation) | Approximately <5% deviation as per prescribed method from calibration reference instruments as absolute maximum deviation. |

Instrument Optical Quality Performance Tests

Various instrument optical quality performance tests, for diagnostic measurements, are described below. The instrument optical quality performance tests may be used, for example, in the performance of diagnostic measurements performed by the measurement processing engine 110 of FIG. 1, and as outlined in the process 500 of FIG. 5 at reference numerals 502, 510, and/or 518.

1.1 Wavenumber Accuracy

In various embodiments, wavenumber accuracy of the spectrometer 100 may be verified using a suitable reference standard. The suitable standard may comprise an argon laser, laser filter (e.g., neodymium-doped yttrium aluminum garnet (Nd: YAG) filter), a highly crystalline polystyrene standard polymer filter with approximately 1 mm thickness, or NIST Standard Reference Material (SRM), such as SRM 1920a rare earth oxide (REO). Measurement results should be consistent with expected performance specifications for wavenumber accuracy.

As one example, repeat measurements are taken using a same reference standard by placing it in the sample beam, without mechanically moving the sample, over a period of about 90 seconds. An open beam reference of about 30 seconds may be used, followed by a second sample run of about 90 seconds. Afterwards, a first derivative of each of the background replicate spectra may be calculated, and inflection or zero-crossing positions for a center band at the polystyrene absorbance peak near the reference wavenumber position ($\rho_x$) (e.g., 5940 cm$^{-1}$) may be computed. A ratioed spectrum may be computed for each scan (i.e., scan-to-scan for each sample) and for the mean spectrum over the 90 second measurement period. Then, a standard deviation of difference of wavenumber positions for the zero crossings for scan-to-scan (within replicate samples) and the mean spectrum position ($\bar{x}_i$) for the measured ($x_{ij}$) versus reference ($\rho_x$) wavenumber values may be calculated. In this context, standard deviation is calculated according to equation (1) below.

$$\sigma_i = \sqrt{\frac{\sum_{j=1}^{r_i} (x_{ij} - \rho_x)^2}{r_i}}, \quad (1)$$

where $\sigma_i$ is the standard deviation for scan-to-scan wavenumber accuracy; $x_{ij}$ are individual measured wavenumber shifts of the zero-crossover for sample i and scan-to-scan number j; $\rho_x$ is a reference wavenumber position for the polystyrene filter near 5940 cm$^{-1}$; $r_i$ is a number of replicate measurements (i.e., a pool of all scan-to-scan data). The mean difference for wavelength accuracy is determined according to $\bar{x}_i - \rho_x$, where $\bar{x}_i$ is an average wavenumber for the scan-to-scan set; and $\rho_x$ is a reference wavenumber position for the polystyrene filter near 5940 cm$^{-1}$. The results are reported as a metric of wavenumber accuracy (in units of cm$^{-1}$), and may be tabulated according to the format outlined in Table 2 below.

TABLE 2

| | Nominal Reference Value ($\rho_x$) | Accuracy ($\sigma_i$) as precision (scan-to-scan standard deviation from reference) | Accuracy (as mean difference from reference) |
|---|---|---|---|
| Scan-to-Scan | — | | |
| Average | — | | |

1.2 Wavenumber Repeatability

In various embodiments, wavelength repeatability of the spectrometer 100 may be verified using a suitable quality control standard, such as a highly crystalline polystyrene sample of approximately 1 mm in thickness. The standard deviation of the selected wavenumber should be consistent with expected performance specifications for wavenumber repeatability.

As one example, repeat measurements are taken using a same reference standard by placing it in the sample beam, without mechanically moving the sample, over a period of about 90 seconds. An open beam reference of about 30 seconds may be used, followed by a second sample run of about 90 seconds. Afterwards, a first derivative of each of the background replicate spectra may be calculated, an inflection or zero-crossing positions for a center band at the polystyrene absorbance peak near 5940 cm$^{-1}$ may be calculated for each scan (i.e., scan-to-scan for each sample), and the mean spectrum position ($\bar{x}_i$) for the measured ($x_{ij}$) may be calculated. In this context, standard deviation is calculated according to equation (2) below.

$$\sigma_i = \sqrt{\frac{\sum_{j=1}^{r_i} (x_{ij} - \bar{x}_i)^2}{r_i - 1}}, \quad (2)$$

where $\sigma_i$ is the standard deviation for the scan-to-scan wavelength precision or repeatability for the scan-to-scan measurements; where $x_{ij}$ are individual wavenumber shifts of the zero-crossover for sample i and scan-to-scan number j; $\bar{x}_i$ is an average value for the scan-to-scan set; and $r_i$ is a number of replicate measurements (i.e., a pool of all scan-to-scan data). The mean spectrum position ($\bar{x}_i$) is calculated according to equation (3) below.

$$\bar{x}_i = \frac{\sum_{i}^{r_i} x_i}{r_i} \quad (3)$$

The results are reported as a metric of wavenumber repeatability, and may be tabulated according to the format outlined in Table 3 below.

TABLE 3

| | Mean wavenumber ($\bar{x}_i$) | Precision/Repeatability ($\sigma_i$) |
|---|---|---|
| Scan-to-Scan | | |

1.3 Absorbance/Response Accuracy

In various embodiments, absorbance or response accuracy of the spectrometer 100 may be verified using a suitable reference standard. For example, a pre-specified reference neutral density (ND) filter with a nominal optical density (OD) of about 1.5 to 2.1 Au (about 3.15 to 0.81 percent transmittance, respectively) may be used. The ND filter should be provided with reference measurements at 7000 cm$^{-1}$ for 1429 nm and 4500 cm$^{-1}$ for 2222 nm. A standard deviation of the optical response accuracy should be consistent with expected performance specifications for absorbance or response accuracy.

As one example, repeat measurements are taken using a same reference standard by placing it in the sample beam, without mechanically moving the sample, over a period of about 90 seconds. An open beam reference of about 30 seconds may be used, followed by a second sample run of about 90 seconds. Afterwards, an optical density for the entire spectrum and, specifically, at certain measured reference points (e.g., 7000 cm$^{-1}$ and 4500 cm$^{-1}$ for the ND filter) may be calculated. For the ND filter, the reference OD for each wavenumber position, $\rho_{7000\ cm^{-1}}$ and $\rho_{4500\ cm^{-1}}$ is measured for each scan (i.e., scan-to-scan for each sample) and for the mean spectrum ($\bar{x}_i$) over 90 seconds.

In this context, standard deviations are calculated according to equations (4) and (5) below.

$$\sigma_{7000cm^{-1}} = \sqrt{\frac{\sum_{j=1}^{r_i}(x_{ij} - \rho_{7000cm^{-1}})^2}{r_i}} \text{ and} \quad (4)$$

$$\sigma_{4500cm^{-1}} = \sqrt{\frac{\sum_{j=1}^{r_i}(x_{ij} - \rho_{4500cm^{-1}})^2}{r_i}}, \quad (5)$$

where $\sigma_{\rho_{cm^{-1}}}$ is the standard deviation for the scan-to-scan optical density accuracy for the scan-to-scan measurements; $x_{ij}$ are individual measurements of the optical density for sample i and scan-to-scan number j; $\rho_{7000\ cm^{-1}}$ and $\rho_{4500\ cm^{-1}}$ are the reference values for the ND filter at 7000 cm$^{-1}$ and 4500 cm$^{-1}$; and $r_i$ is a number of replicate measurements (i.e., a pool of all scan-to-scan data). The mean difference for photometric accuracy at both wavenumber positions is determined according to $\bar{x}_i - \rho_x$, where $\bar{x}_i$ is an average photometric value for the scan-to-scan set; and $\rho_x$ is a reference photometric value at each of 7000 cm$^{-1}$ and 4500 cm$^{-1}$. The results are reported as a metric of absorbance or response accuracy (in units of Au), and may be tabulated according to the format outlined in Table 4 below.

TABLE 4

| | Nominal Reference Value ($\rho_{7000cm^{-1}}$) | Accuracy as precision ($\sigma_{7000cm^{-1}}$) | Accuracy (as mean difference) 7000 cm$^{-1}$ | Nominal Reference Value ($\rho_{4500cm^{-1}}$) | Accuracy as Precision ($\sigma_{4500cm^{-1}}$) | Accuracy (as mean difference) 4500 cm$^{-1}$ |
|---|---|---|---|---|---|---|
| Scan-to-Scan Average | — | | | — | | |

1.4 Absorbance/Response Repeatability

In various embodiments, absorbance or response repeatability of the spectrometer 100 may be verified using a suitable reference standard. For example, a pre-specified ND filter with a nominal OD of about 1.5 to 2.1 Au (about 3.15 to 0.81 percent transmittance, respectively) may be used. A standard deviation of the optical response repeatability should be consistent with expected performance specifications for absorbance or response repeatability.

As one example, repeat measurements are taken using a same reference standard by placing it in the sample beam, without mechanically moving the sample, over a period of about 90 seconds. An open beam reference of about 30 seconds may be used, followed by a second sample run of about 90 seconds. Afterwards, an optical density for the entire spectrum and, specifically, at certain measured reference points (e.g., 7000 cm$^{-1}$ and 4500 cm$^{-1}$ for the ND filter) may be calculated. Afterwards, an optical density is measured for each scan (i.e., scan-to-scan for each sample). Mean and standard deviation of the OD are measured at two wavenumber positions for scan-to-scan (within replicate samples). This statistic is calculated for both 7000 cm$^{-1}$ and 4500 cm$^{-1}$ wavenumbers as according to equation (6) below.

$$\sigma_i = \sqrt{\frac{\sum_{j=1}^{r_i}(x_{ij} - \bar{x}_i)^2}{r_i - 1}}, \quad (6)$$

where $\sigma_i$ is the standard deviation for the scan-to-scan optical density (Au) repeatability for the scan-to-scan measurements; $x_{ij}$ are individual measurements of the optical density for sample i and scan-to-scan number j; $\bar{x}_i$ are mean measured values for the ND filter at 7000 cm$^{-1}$ and 4500 cm$^{-1}$; and $r_i$ is a number of replicate measurements (i.e., a pool of all scan-to-scan data). The results are reported as a metric of absorbance or response repeatability (in units of Au), and may be tabulated according to the format outlined in Table 5 below.

TABLE 5

| | Mean at 7000 cm$^{-1}$ ($\bar{x}_i$) | Repeatability ($\sigma_{7000cm^{-1}}$) | Mean at 4500 cm$^{-1}$ ($\bar{x}_i$) | Repeatability ($\sigma_{4500cm^{-1}}$) |
|---|---|---|---|---|
| Scan-to-Scan | | | | |

1.5 Photometric Linearity

In various embodiments, photometric linearity of the spectrometer 100 may be verified using a suitable reference standard or set of suitable reference standard. For example, a set of reference ND filters may be used. An observed response is plotted against the expected response. The slope of the line for reference (x) versus measured (y) data should be approximately 1.00±0.05, and the intercept approximately 0.00±0.05. The slope and intercept is calculated using ND filters with values of about 1.0, 1.3, 1.5, 2.0, 2.5, and 3.0 OD. An open beam reference of about 30 seconds may be used, followed by a second sample run of about 90 seconds. It is noted that a reference value used may be the mean value for each filter measured on at least 4 instruments used for initial calibration modeling.

A full spectrum of data is recorded, and results are reported as a graph of the measured response against the expected response at 7000 cm$^{-1}$ and 4500 cm$^{-1}$, for example, or at other measured reference points. The results are reported as a metric linearity at 7000 cm$^{-1}$ and 4500 cm$^{-1}$, for example, or at other measured reference points, and may be tabulated according to the format outlined in Table 6 below.

TABLE 6

| Slope at 7000 cm$^{-1}$ | Intercept at 7000 cm$^{-1}$ | Slope at 4500 cm$^{-1}$ | Intercept at 4500 cm$^{-1}$ |
|---|---|---|---|

It is noted that the slope (b) and intercept (a) for the data set of $x_i$ (actual) and $y_i$ (measured) pairs of measurements for each wavenumber position are provided according to equations 7 and 8 below.

$$b = \frac{\sum_{i} \{(x_i - \bar{x})(y_i - \bar{y})\}}{\sum_{i} (x_i - \bar{x})^2} \quad (7)$$

$$a = \bar{y} - b\bar{x} \quad (8)$$

1.6 Photometric Noise

In various embodiments, photometric noise for the spectrometer instrument is determined using a reference ND filter at about 1.5 OD. As one example, repeat measurements are taken using the ND filter by placing it in the sample beam, without mechanically moving the sample, over a period of about 90 seconds. An open beam reference of about 30 seconds may be used, followed by a second sample run of about 90 seconds.

Peak-to-peak photometric noise is calculated over the entire spectrum as a standard deviation of the spectrum over the measurement region, excluding trim areas. The photometric noise is computed as a standard deviation of the spectral response, and should be consistent with expected performance specifications for photometric noise. The photometric noise may be calculated for a single spectrum averaged over a standard measurement period of about 90 seconds according to equation (9) below.

$$\sigma_i = \sqrt{\frac{\sum_{j=1}^{v_i} (x_{ij} - \bar{x}_i)^2}{v_i - 1}}, \quad (9)$$

where $\sigma_i$ is the standard deviation (i.e., noise) for an averaged spectrum of about 700 scan-to-scan measurements for each wavenumber (at 90 seconds); $x_{ij}$ are individual absorbance measurements i for the averaged spectrum at wavenumber j; $\bar{x}_i$ is the average optical density value for the averaged spectrum; and $v_i$ is the number of data points (in wavenumbers). The results are reported as a metric of photometric noise, and may be tabulated according to the format outlined in Table 7 below.

TABLE 7

|  | mean ($\bar{x}_i$) | Photometric Noise ($\sigma_i$) |
|---|---|---|
| Averaged Spectrum |  |  |

2. Signal Averaging Tests

In various embodiments, photometric noise for the spectrometer 100 may be determined using a suitable reference standard. For example, a reference ND filter at near 3.15 percent transmittance (about 1.5 OD) may be used for the test, and the results may be reported in transmittance. As one example, repeat measurements are taken using a same reference standard by placing it in the sample beam, without mechanically moving the sample, over a period of about 90 seconds. An open beam reference of about 30 seconds may be used, followed by a second sample run of about 90 seconds. Peak-to-peak photometric noise may be calculated over multiple sets of scan-to-scan spectra as standard deviation of ratioed transmittance spectrum for each measurement (an average of before and after background measurements before ratioing the spectra).

In certain exemplary embodiments, signal averaging tests are completed using one or more of the methods described below.

2.1 Random Noise Test

As a first signal averaging test, short-, medium-, and long-term drift, slope, and background curvature over time by measurements of alternating background and sample spectra are excluded. The test simulates "dual beam" conditions and excludes most of the impact from longer term periodic instrument drift. For example, for two referenced spectra, the background is measured, the sample is measured, the background is measured, and then the sample is measured. The spectra measurements are collected and averaged. This sequence is repeated for a number of co-added spectra: 1, 2, 4, 16, 64, 256, etc. The background corrected spectra is calculated by referencing alternate (i.e., sandwiched) spectra for averaged scans, then the standard deviation is computed according to equation (10) below.

$$\sigma_i = \sqrt{\frac{\sum_{i=1}^{n_i} (x_r - \bar{x}_r)^2}{(r_i - 1)}}, \quad (10)$$

where $\sigma_i$ is the standard deviation (noise) for transmittance values at each pre-selected wavenumber comprised of some number of replicate ($r_i$) scan-to-scan measurements; $x_r$ represents r (replicate) co-added transmittance measurements for each scan at a pre-selected wavenumber; $\bar{x}_r$ is the mean transmittance value for each co-added spectrum; and $r_i$ is the number of averaged spectra.

2.2 Noise Test (Including Medium- or Short-Term Drift)

As another signal averaging test, background measurements are taken for a same number of scans as the sample measurement used for the co-added result. For example, measurements are taken for 1, 2, 4, 16, 64, 256, etc., as an alternate background co-added set. Then the samples are co-added. For example, 2 scans may be measured as background and 2 sample spectra, the measurements averaged and ratio as a single spectrum, and a standard deviation calculated. In another example (e.g., for n=4), 4 scans may be measured as background and 4 sample spectra, the measurements averaged and ratio as a single spectrum, and a standard deviation calculated. The standard deviation may be calculated according to equation (11) below.

$$\sigma_i = \sqrt{\frac{\sum_{i=1}^{n_i} (x_r - \bar{x}_r)^2}{(r_i - 1)}}, \quad (11)$$

where $\sigma_i$ is the standard deviation (noise) for transmittance values at each pre-selected wavenumber comprised of some number of replicate ($r_i$) scan-to-scan measurements; $x_r$ represents r (replicate) co-added transmittance measurements for each scan at a pre-selected wavenumber; $\bar{x}_r$ is the mean transmittance value for each co-added spectrum; and $r_i$ is the number of averaged spectra.

2.3 Noise Test (Including Long-Term Drift)

As still another signal averaging test, background measurements are taken at start of run and then measurement samples taken in sequence using the original background. An average spectra is generated from a number r scans, across an entire number of scans available. For example, for r=4, scans 1-4, 5-8, etc. are averaged; for r=16, scans 1-16, 17-32, etc. are averaged. Then, a standard deviation is calculated across the averaged spectra using equation (12) below.

$$\sigma_i = \sqrt{\frac{\sum_{i=1}^{r_i}(x_r - \bar{x}_r)^2}{(r_i - 1)}},\qquad(12)$$

where $\sigma_i$ is the standard deviation (noise) for transmittance values at each pre-selected wavenumber comprised of some number of replicate ($r_i$) scan-to-scan measurements; where $x_r$ represents r (replicate) co-added transmittance measurements for each scan at a pre-selected wavenumber; $\bar{x}_r$ is the mean transmittance value for each co-added spectrum; and $r_i$ is the number of averaged spectra.

2.4 Other Noise Tests

In other measurement aspects, a signal averaging test may be performed. For the signal averaging test, a series of replicate scan-to-scan spectra is obtained in transmittance mode. A subset of replicate scans is calculated. The calculation is performed for the following number of scans: 1, 4, 16, 64, 256, 1024, 4096, 16384, etc., up to a maximum measurement time of interest. A ratio is created for each pair, and the noise level is calculated at about 7500 cm$^{-1}$ (1333 nm), 7000 cm$^{-1}$ (1429 nm), 6000 cm$^{-1}$ (1667 nm), 5000 cm$^{-1}$ (2000 nm), 4500 cm$^{-1}$ (2222 nm), and 4000 cm$^{-1}$ (2500 nm). The noise level should be reduced by a factor of 2 for each successive ratioed spectrum. For example, if 1 scan provided a noise level of 1; 4 scans should provide a noise level of ½; 16 scans should provide a noise level of ¼; 64 scans should provide a noise level of ⅛; and so on, until signal averaging fails. The percent noise level for each successive ratioed spectrum should be a factor of 2 or lower (e.g., 1, ½, ¼, ⅛, 1/16, 1/32, 1/64, 1/128, etc.).

Additionally, a failure of signal averaging may be reported. For example, a number of scans and measurement time for each set of scan-to-scan data used in a particular ratioed spectrum and the noise level may be collected. A failure may be reported when the computed or measured noise level is a minimum of 2 times that of an expected noise reduction. It should be appreciated that spectrometers generally have a limit to practical signal averaging capability, often set by residual interference fringing by optical components, by the apodization-determined feet of the moisture interferences, by the electronic noise floor due to amplifier and detector performance, or spectrometer alignment or servo errors. Results are reported as photometric noise signal averaging at each wavenumber, and may be tabulated according to the format outlined in Table 8 below. For example, Table 8 may be tabulated for each of: 7500 cm$^{-1}$ (1333 nm), 7000 cm$^{-1}$ (1429 nm), 6000 cm$^{-1}$ (1667 nm), 5000 cm$^{-1}$ (2000 nm), 4500 cm$^{-1}$ (2222 nm), and 4000 cm$^{-1}$ (2500 nm).

TABLE 8

| Number of scans | Expected Noise Reduction Factor | Measured Photometric Noise ($\sigma_i$) | Measured Noise Reduction Factor |
|---|---|---|---|
| 1 | 1 | | |
| 4 | ½ | | |
| 16 | ¼ | | |
| 64 | ⅛ | | |
| 256 | 1/16 | | |
| 1024 | 1/32 | | |
| 4096 | 1/64 | | |
| 16384 | 1/128 | | |
| 65536 | 1/256 | | |

3. Instrument Line Shape (ILS) Test

According to certain aspects, the criteria for the laser emission band or etalon is that a full width at half maximum (FWHM) of the emission line or transmittance band be less than one tenth of the maximum resolution (about 11 nm) of the spectrometer. Further, the beam diameter should be larger than the collecting optics, the radial intensity profile of the beam in the plane of the field stop should be comparable to that of the standard source beam, the frequency of the source should not drift significantly during the period of a full-resolution scan (about 30 seconds), and the emission band should lie in one of the routinely measured spectral regions. In this context, a gas laser is a good choice, due to its narrow line width (limited by acoustic vibrations to about 10$^{-5}$ cm$^{-1}$). Such a narrow line width is typical for cylindrical helium neon (HeNe) laser cavity systems, which are usually available in randomly polarized or linearly polarized versions. Frequency stabilized lasers are also good for this measurement with frequency stability of approximately ±3 MHz or ±10$^{-10}$ cm$^{-1}$ (a stability improvement of 10$^{-5}$ or better over non-stabilized lasers).

Use of the laser system includes an approximately 1.5231 µm (6565.99 cm$^{-1}$) HeNe laser, ideally with optics to expand the beam, flatten its radial intensity profile, and monitor its power. Such a near infrared (e.g., 1.5 µm) laser is enclosed in an insulated box to prevent drafts that cause temperature fluctuations which would, in turn, cause laser frequency drift. If these precautions are not available, it should be noted with the reported test results. The beam from the near infrared laser is positioned as the standard NIR source. The output from the laser is amplified and displayed on an oscilloscope to indicate the laser power. The beam is directed through the interferometer as if it represented the source energy.

Reference Material Substitution and Measurements of a Laser

Figure 8:
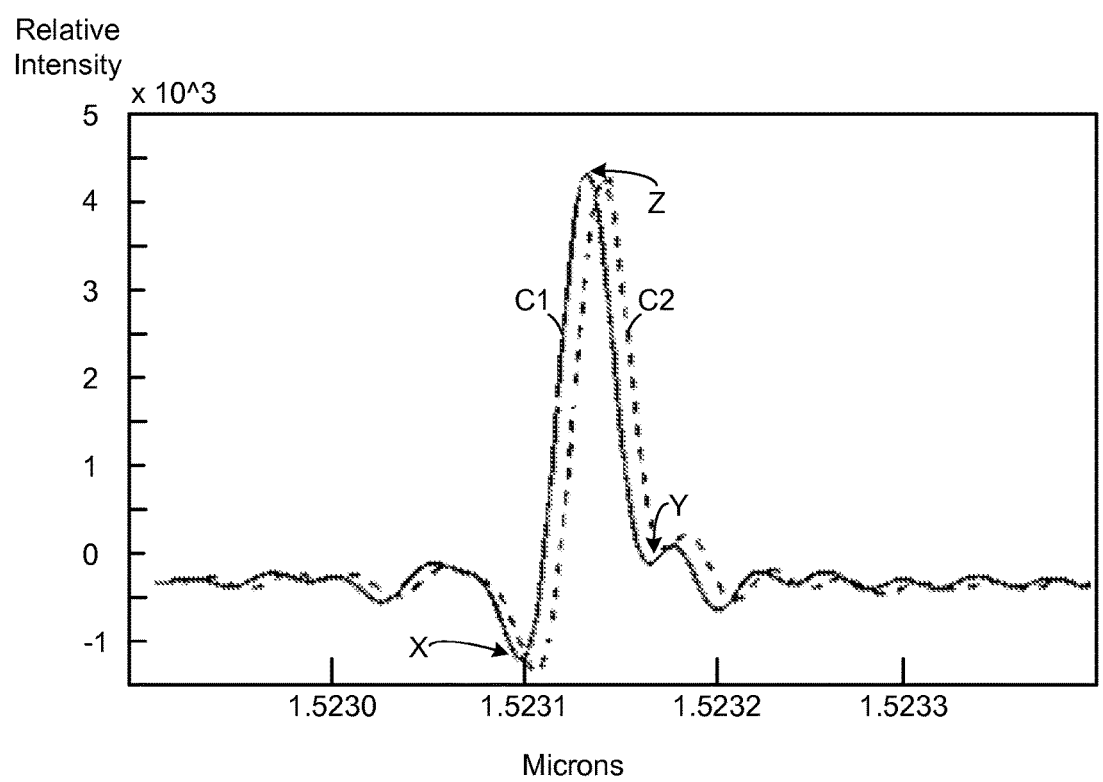
FIG. 8 illustrates a representation of the substitution of reference material for a laser, according to one embodiment.

It is noted that a reference material may be substituted for a laser, given a predetermined line shape, using one or more of the algorithms or techniques described above. FIG. 8 illustrates a representation of the substitution of reference material for a laser, according to one embodiment. In the context of FIG. 8, it is noted that an idealized or reference instrument line shape (iILS) is generally needed for comparison purposes. This iILS can be calculated from theory, from a reference instrument line shape (rILS), or by averaging laser or etalon measurements of multiple interferometers used for initial calibration modeling. As part of a calibration transfer, this reference line shape (rILS) may be replicated in subsequent spectrographic instruments to which the original calibration will be transferred. Line shape tolerances to be used for instruments are established by testing the calibration against synthetic data.

Referring again to FIG. 8, the reference line shape C1 may be measured and pre-designated on a test instrument. The line shape C2 is corrected to the pre-designated values of C1 using matrix transfer methods that allow one shape to be transformed to a reference shape. For example, the line shape C2 may be corrected to the pre-designated line shape C1 using a proscrustean technique or analysis, for example.

Certain critical parameters available when measuring line shape include center wavenumber position, full width at half peak maximum (FWHM), and asymmetry. The tolerances for center wavenumber position are small for spectrometers subject to multivariate applications. This can be measured by center of mass position changes for bands over time, or by the measured shifting of the zero-crossing of the laser band first derivative over time. The effects of wavenumber shift on calibration performance may be tested using artificial data shifts and measuring prediction performance. FWHM is an indication of spectral resolution and should be recorded at time of manufacturing. This parameter is recorded in wavenumbers as the width of a band at one-half the total band height. Finally, the asymmetry can be recorded for a laser line as described above. These measurements may be retained for historical performance, tracking, and diagnosing instrument performance issues.

According to certain aspects of measurement of a laser, after temperature-stabilization, temperature telemetry data is recorded from a spectrometer over 90-second run periods. The laser cavity temperature requirements for non-frequency stabilized lasers requires a maximum temperature drift of not more than approximately 0.1 degrees Celsius in any measurement of about a 90 second interval, and a long term drift of approximately 0.06 degrees Celsius/hour to permit repeatable measurements of the instrument line shape to be obtained.

For low laser line drift rates (e.g., less than about one part in $10^6$, the FWHM of the measured laser line will not change significantly. However, the band will become asymmetric. Asymmetry of the measured instrument line shape is defined as the ratio of the negative lobe depths of the minima immediately on either side of the central peak. This ratio is expressed as a percentage. For example, FIG. 8 shows two theoretical spectra taken some period (e.g., 1 hour) apart. The asymmetry in relative intensity of the lines is given by the absolute value of the value at reference Y divided by the value at reference X in FIG. 8, or approximately |−0.3/−0.9| (100)=30%. In addition, the drift in the laser frequency, at reference Z of FIG. 8, is measured during the course of replicate scans. From theoretical models it can be demonstrated that laser drift rate should produce an asymmetry of approximately <10%, which is significantly less than the 30% asymmetry illustrated in FIG. 8. If the asymmetry is greater than about 10%, it can be determined that there is some general instrumental effect producing excess asymmetry which must be corrected before calibration transfer can be effective.

Figure 9:
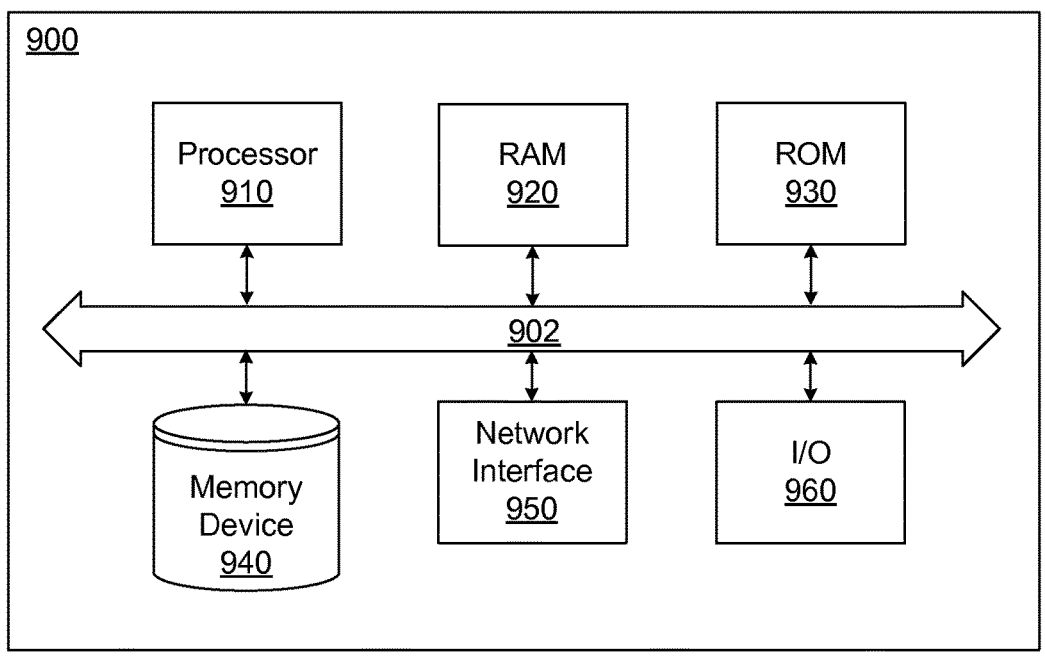
FIG. 9 illustrates an example schematic block diagram of a computing architecture that may be employed by the spectrometer of FIG. 1 according to various embodiments described herein.

FIG. 9 illustrates an example schematic block diagram of a computing architecture 900 that may be employed by the spectrometer 100 of FIG. 1 according to various embodiments described herein. The computing architecture 900 may be embodied, in part, using one or more elements of a general purpose computer. The computing architecture 900 includes a processor 910, a Random Access Memory (RAM) 920, a Read Only Memory (ROM) 930, a memory device 940, a network interface 950, and an Input Output ("I/O") interface 960. The elements of computing architecture 900 are communicatively coupled via a bus 902. The elements of the computing architecture 900 described herein are not intended to be limiting in nature, and the computing architecture 900 may include other elements.

In various embodiments, the processor 910 may comprise any well-known general purpose arithmetic processor, state machine, or Application Specific Integrated Circuit (ASIC), for example. In various embodiments, the measurement processing engine 110 may be implemented, in part, by the processor 910. The processor 910 may include one or more circuits, one or more microprocessors, ASICs, dedicated hardware, or any combination thereof. In certain aspects embodiments, the processor 910 is configured to execute one or more software modules. The processor 910 may further include memory configured to store instructions and/or code to various functions, as further described herein. In certain embodiments, the processor 910 may comprise a state machine or ASIC, and the process 500 described in FIG. 5 may be implemented or executed by the state machine or ASIC according to a specialized or embedded circuitry design, by firmware, or a combination of a circuitry and firmware.

The RAM and ROM 920 and 930 comprise any well-known random access and read only memory devices that store computer-readable instructions to be executed by the processor 910. The memory device 940 stores computer-readable instructions thereon that, when executed by the processor 910, direct the processor 910 to execute various aspects of the embodiments described herein.

As a non-limiting example group, the memory device 940 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 950 comprises hardware interfaces to communicate over data networks. The I/O interface 960 comprises device input and output interfaces such as keyboard, pointing device, display, communication, and/or other interfaces. The bus 902 electrically and communicatively couples the processor 910, the RAM 920, the ROM 930, the memory device 940, the network interface 950, and the I/O interface 960, so that data and instructions may be communicated among them.

In certain aspects, the processor 910 is configured to retrieve computer-readable instructions and data stored on the memory device 940, the RAM 920, the ROM 930, and/or other storage means, and copy the computer-readable instructions to the RAM 920 or the ROM 930 for execution, for example. The processor 910 is further configured to execute the computer-readable instructions to implement various aspects and features of the embodiments described herein. For example, the processor 910 may be adapted or configured to execute the processes described above with reference to FIG. 5. In embodiments where the processor 910 comprises a state machine or ASIC, the processor 910 may include internal memory and registers for maintenance of data being processed.

The flowchart or process of FIG. 5 is representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 910. The machine code may be converted from the source code, etc. Further, each block may represent, or be connected with, a circuit or a number of interconnected circuits to implement a certain logical function or process step.

Although the flowchart or process diagram of FIG. 5 illustrates an order, it is understood that the order may differ from that which is depicted. For example, an order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method, comprising:
performing, with a spectrographic instrument, an instrument diagnostic measurement on a secondary reference standard for evaluation of an instrument calibration model of the spectrographic instrument;
analyzing, using a processor of the spectrographic instrument, a result of the instrument diagnostic measurement to determine a deviation from an expected benchmark performance criteria;
reconstructing, using the processor of the spectrographic instrument, a calibration parameter in the instrument calibration model using an instrument calibration correction algorithm based at least in part on the deviation from the expected benchmark performance criteria;
after reconstructing the calibration parameter in the instrument calibration model, determining, using the processor of the spectrographic instrument, whether the instrument diagnostic measurement meets the expected benchmark performance criteria;
based on a determination that the instrument diagnostic measurement meets the expected benchmark performance criteria, performing, with the spectrographic instrument, a product model diagnostic measurement on the secondary reference standard for evaluation of an aspect of calibration in a product calibration model of the spectrographic instrument;
analyzing, using the processor of the spectrographic instrument, a result of the product model diagnostic measurement to determine a product model deviation from an expected product model benchmark performance criteria;
reconstructing, using the processor of the spectrographic instrument, a calibration parameter in the product calibration model using a product model correction algorithm based at least in part on the product model deviation from the expected product model benchmark performance criteria; and
performing, with the spectrographic instrument, a verification measurement on a product sample to verify the aspect of calibration in the product calibration model.

2. The method of claim 1, wherein performing the instrument diagnostic measurement and performing the product model diagnostic measurement each comprises performing diagnostic measurements on the secondary reference standard to evaluate a plurality of aspects of calibration for near-infrared spectroscopy.

3. The method of claim 2, wherein the plurality of aspects of calibration comprise wavelength accuracy, wavelength linearity, photometric accuracy, photometric linearity, instrument line shape, detector response, and source color temperature aspects of calibration.

4. The method of claim 1, wherein the secondary reference standard comprises a National Institute of Standards and Technology (NIST) traceable certified reference standard.

5. The method of claim 1, wherein analyzing the result of the instrument diagnostic measurement comprises determining, using the processor of the spectrographic instrument, whether additional adjustment to the instrument calibration model is required based at least in part on the expected benchmark performance criteria.

6. The method of claim 1, wherein:
performing the instrument diagnostic measurement comprises performing an instrument diagnostic measurement for each of a plurality of aspects of calibration for near-infrared spectroscopy;
analyzing the result of the instrument diagnostic measurement comprises analyzing a respective result of the instrument diagnostic measurement for each of the plurality of aspects of calibration; and
reconstructing the calibration parameter in the instrument calibration model comprises applying a respective instrument correction algorithm for each of the plurality of aspects of calibration.

7. The method of claim 1, wherein reconstructing the calibration parameter in the instrument calibration model comprises at least one of applying a filter for noise compensation, applying a photometric correction for baseline and linear response signatures, or applying a response shape correction.

8. The method of claim 1, wherein:
analyzing the result of the product model diagnostic measurement comprises evaluating, using the processor of the spectrographic instrument, linearity and integrity of the result of the product model diagnostic measurement; and
reconstructing the calibration parameter in the product calibration model comprises using a linear or non-linear product model calibration correction algorithm to adjust the aspect of calibration in the product calibration model based at least in part on the product model deviation.

9. A spectrographic instrument, comprising:
spectrographic instrumentation for performing spectrographic measurements; and
a measurement processing engine configured to:
perform an instrument diagnostic measurement on a secondary reference standard using the spectrographic instrumentation for evaluation of an instrument calibration model of the spectrographic instrumentation;
analyze a result of the instrument diagnostic measurement to determine a deviation from an expected benchmark performance criteria;

reconstruct a calibration parameter in the instrument calibration model using an instrument calibration correction algorithm based at least in part on the deviation from the expected benchmark performance criteria;

after the calibration parameter in the instrument calibration model is reconstructed, determine whether the instrument diagnostic measurement meets the expected benchmark performance criteria;

based on a determination that the instrument diagnostic measurement meets the expected benchmark performance criteria, perform a product model diagnostic measurement on the secondary reference standard using the spectrographic instrumentation for evaluation of an aspect of calibration in a product calibration model of the spectrographic instrumentation;

analyze a result of the product model diagnostic measurement to determine a product model deviation from an expected product model benchmark performance criteria;

reconstruct a calibration parameter in the product calibration model using a product model correction algorithm based at least in part on the product model deviation from the expected product model benchmark performance criteria; and perform a verification measurement on a product sample using the spectrographic instrumentation to verify the aspect of calibration in the product calibration model.

10. The spectrographic instrument of claim 9, wherein the measurement processing engine is further configured to perform the instrument diagnostic measurement and the product model diagnostic measurement on the secondary reference standard to evaluate a plurality of aspects of calibration for near-infrared spectroscopy.

11. The spectrographic instrument of claim 9, wherein the secondary reference standard comprises a National Institute of Standards and Technology (NIST) traceable certified reference standard.

12. The spectrographic instrument of claim 9, wherein the measurement processing engine is further configured to determine whether additional adjustment to the instrument calibration model is required based at least in part on the expected benchmark performance criteria.

13. The spectrographic instrument of claim 9, wherein the measurement processing engine is further configured to:
perform an instrument diagnostic measurement for each of a plurality of aspects of calibration for near-infrared spectroscopy;
analyze a respective result of the instrument diagnostic measurement for each of the plurality of aspects of calibration; and
reconstruct the calibration parameter in the instrument calibration model using a respective instrument correction algorithm for each of the plurality of aspects of calibration.

14. A method, comprising:
performing, with a spectrographic instrument, an instrument diagnostic measurement on a secondary reference standard for evaluation of an instrument calibration model of the spectrographic instrument;

analyzing, using a processor of the spectrographic instrument, a result of the instrument diagnostic measurement to determine a deviation from an expected benchmark performance criteria;

reconstructing, using the processor of the spectrographic instrument, a calibration parameter in the instrument calibration model using an instrument calibration correction algorithm based at least in part on the deviation from the expected benchmark performance criteria;

after reconstructing the calibration parameter in the instrument calibration model, determining, using the processor of the spectrographic instrument, whether the instrument diagnostic measurement meets the expected benchmark performance criteria;

based on a determination that the instrument diagnostic measurement meets the expected benchmark performance criteria, performing, with the spectrographic instrument, a product model diagnostic measurement on the secondary reference standard for evaluation of an aspect of calibration in a product calibration model of the spectrographic instrument;

analyzing, using the processor of the spectrographic instrument, a result of the product model diagnostic measurement to determine a product model deviation from an expected product model benchmark performance criteria; and applying, using the processor of the spectrographic instrument, a product model correction algorithm to the product calibration model based at least in part on the product model deviation from the expected product model benchmark performance criteria.

15. The method of claim 14, wherein the secondary reference standard comprises a National Institute of Standards and Technology (NIST) traceable certified reference standard.

16. The method of claim 14, wherein:
analyzing the result of the instrument diagnostic measurement comprises determining, using the processor of the spectrographic instrument, whether additional adjustment to the instrument calibration model is required based at least in part on the expected benchmark performance criteria; and
analyzing the result of the product model diagnostic measurement comprises determining, using the processor of the spectrographic instrument, whether additional adjustment to the product calibration model is required based at least in part on the expected product model benchmark performance criteria.

17. The method of claim 14, wherein:
performing the instrument diagnostic measurement comprises performing, with the spectrographic instrument, an instrument diagnostic measurement for each of a plurality of aspects of calibration;
analyzing the result of the instrument diagnostic measurement comprises analyzing, using the processor of the spectrographic instrument, a respective result of the instrument diagnostic measurement for each of the plurality of aspects of calibration; and
reconstructing the calibration parameter in the instrument calibration model comprises applying, using the processor of the spectrographic instrument, a respective instrument correction algorithm for each of the plurality of aspects of calibration.

* * * * *